US010223333B2

United States Patent
Chetlur et al.

(10) Patent No.: US 10,223,333 B2
(45) Date of Patent: Mar. 5, 2019

(54) PERFORMING MULTI-CONVOLUTION OPERATIONS IN A PARALLEL PROCESSING SYSTEM

(71) Applicant: NVIDIA CORPORATION, Santa Clara, CA (US)

(72) Inventors: Sharanyan Chetlur, Sunnyvale, CA (US); Bryan Catanzaro, Cupertino, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 94 days.

(21) Appl. No.: 14/838,291

(22) Filed: Aug. 27, 2015

(65) Prior Publication Data
US 2016/0062947 A1 Mar. 3, 2016

Related U.S. Application Data

(60) Provisional application No. 62/043,901, filed on Aug. 29, 2014.

(51) Int. Cl.
*G06F 17/15* (2006.01)
(52) U.S. Cl.
CPC ................. *G06F 17/153* (2013.01)
(58) Field of Classification Search
CPC .................................................. G06F 17/153
See application file for complete search history.

(56) References Cited

U.S. PATENT DOCUMENTS

2007/0292047 A1* 12/2007 Jiao ..................... G06F 17/153
382/279
2008/0219580 A1* 9/2008 Porikli ..................... G06T 5/20
382/260

(Continued)

OTHER PUBLICATIONS

P. Y. Simard, D. Steinkraus, & J. Platt, "Best Practice for Convolutional Neural Networks Applied to Visual Document Analysis," International Conference on Document Analysis and Recognition (ICDAR), IEEE Computer Society, Los Alamitos, 2003, pp. 958-962.

(Continued)

*Primary Examiner* — Chuong D Ngo
(74) *Attorney, Agent, or Firm* — Artegis Law Group, LLP

(57) ABSTRACT

In one embodiment of the present invention a convolution engine configures a parallel processing pipeline to perform multi-convolution operations. More specifically, the convolution engine configures the parallel processing pipeline to independently generate and process individual image tiles. In operation, for each image tile, the pipeline calculates source locations included in an input image batch. Notably, the source locations reflect the contribution of the image tile to an output tile of an output matrix—the result of the multi-convolution operation. Subsequently, the pipeline copies data from the source locations to the image tile. Similarly, the pipeline copies data from a filter stack to a filter tile. The pipeline then performs matrix multiplication operations between the image tile and the filter tile to generate data included in the corresponding output tile. To optimize both on-chip memory usage and execution time, the pipeline creates each image tile in on-chip memory as-needed.

18 Claims, 8 Drawing Sheets

(56) References Cited

U.S. PATENT DOCUMENTS

| | | | |
|---|---|---|---|
| 2014/0112596 A1* | 4/2014 | Yang ................... | G06F 17/153 |
| | | | 382/279 |
| 2016/0162402 A1* | 6/2016 | Woolley, Jr. ............ | G06K 9/00 |
| | | | 711/202 |

OTHER PUBLICATIONS

Y. LeCun, L. Bottou, Y. Bengio, and P. Haffner, "Gradient-Based Learning Applied to Document Recognition," Proceedings of the IEEE, vol. 86, No. 11, pp. 2278-2324, Nov. 1998.

O. Matan, C.J.C Burges, Y. LeCun and J. S Denker (1992), "Multi-Digit Recognition Using a Space Displacement Neural Network," in NIPS'92.

J. Kruger, and R. Westermann, "Linear Operators for GPU Implementation of Numerical Algorithms," Proceedings of SIGGRAPH, San Diego, 2003, pp. 908-916.

\* cited by examiner

PERFORMING MULTI-CONVOLUTION OPERATIONS IN A PARALLEL PROCESSING SYSTEM

CROSS-REFERENCE TO RELATED APPLICATIONS

This application claims benefit of the U.S. Provisional Patent Application having Ser. No. 62/043,901 and filed on Aug. 29, 2014. The subject matter of this related application is hereby incorporated herein by reference.

BACKGROUND OF THE INVENTION

Field of the Invention

Embodiments of the present invention relate generally to computer processing and, more specifically, to performing multi-convolution operations in a parallel processing system.

Description of the Related Art

Convolutional Neural Networks (CNNs) are used to efficiently and reliably solve a wide range of classification problems. For example, CNNs are included in many image recognition, handwriting recognition, and speech translation algorithms. In operation, CNNs can substantially reduce the error rates compared to many simpler machine learning techniques. However, the time required for CNNs to execute usually exceeds the time required for simpler machine learning techniques to execute. Consequently, time-sensitive applications may be structured to implement simpler machine learning techniques at the expense of producing inferior results.

The time required for a CNN to execute is dominated by the time required for the CNN to perform "multi-convolution" operations. A multi-convolution operation is a generalized form of a two-dimension convolution operation between an image and a filter. The multi-convolution operation is oftentimes implemented using a direct calculation method or using Fast Fourier Transforms (FFTs). While direct calculation techniques and FFT-based techniques may enable some multi-convolution operations to be implemented more efficiently, such techniques normally are unable to cause multi-convolution operations to execute efficiently over the wide range of dimensions and additional parameters associated with standard CNNs.

More specifically, a CNN typically includes multiple "convolution layers," where each convolution layer performs convolution operations across four dimensions of an image batch and four dimensions of a filter stack. The four dimensions of the image batch include the image width, the image height, the number of color planes per image, and the number of images in the image batch. The four dimensions of the filter stack include the filter width, the filter height, the number of feature planes per filter, and the number of filters in the filter stack. Additional parameters may further customize the multi-convolution operations. For example, a horizontal filter stride and a vertical filter stride may reduce the overall computational load by decreasing the size of the subset of pixels involved in the convolution operation. Notably, the dimensions of the image batch and the filter batch as well as the additional parameters often vary between convolution layers.

Direct calculation techniques are typically tuned to optimize multi-convolution operations across a relatively small subset of dimensions and parameters. However, the performance of direct calculation techniques across other dimensions and parameters usually exceeds the time required to execute simpler machine learning techniques. Consequently, the time required to execute many CNNs using direct calculation techniques is typically unacceptably long. The time required to execute many CNNs using FFT-based approaches also varies dramatically based on the values of the parameters. In particular, if the horizontal stride or the vertical stride associated with a multi-convolution operation is greater than one, then the time required to execute the multi-convolution operation using FFT-based techniques may be prohibitively long.

In one approach to reducing the time required to execute CNNs across a wide range of parameter values, a convolution engine "unrolls" the multi-convolution operations by replacing the conventional processing of each convolution layer with matrix-based operations. In operation, the convolution engine converts the image stack into a column major image matrix and expresses the filter stack as a filter matrix. To reduce the performance degradation associated with fetching data from off-chip memory, the convolution engine stores the image matrix and the filter stack in on-chip memory. Subsequently, the convolution engine performs matrix multiplication operations between the image matrix and the filter stack. Notably, the dimensions of the image matrix and the filter matrix correlate to products of subsets of the independent parameters of the CNN instead of the individual parameters. Consequently, matrix-based techniques exhibit relatively uniform performance characteristics across the different input dimensions and parameters. Further, because many processing units include highly-tuned implementations of matrix multiplication functions, the time required to execute a CNN via the foregoing approach may be significantly less than the time required to execute the CNN using direct calculation or FFT-based techniques.

One drawback of matrix-based convolution engines is that, as part of converting the image stack to properly set up the matrix multiplication operations, the convolution engine has to copy the image data to multiple locations included in the image matrix. Consequently, the size of the image matrix may increase to the point where the available on-chip memory is completely consumed. For example, suppose that the image width were W, the image height were H, the number of color planes per image were C, and the number of images in the image batch were N. Further, suppose that the dimensions of each of the output images were (P×Q). In such a scenario, the dimensions of the image matrix would be (N×P×Q)×(C×R×S). Notably, for many applications, the memory required to store the image matrix may exceed the available on-chip memory. Consequently, those applications are relegated to implementing either less efficient CNN techniques or less accurate machine learning techniques.

As the foregoing illustrates, what is needed in the art is a more effective approach to performing multi-convolution operations.

SUMMARY OF THE INVENTION

One embodiment of the present invention sets forth a computer-implemented method for performing a multi-convolution operation. The method includes calculating a first source location included in an image batch that is stored in a first memory based on a first destination location included in a first image tile that is stored in a second memory; copying data from the first source location to the first destination location; copying data from a filter source location included in a filter stack that is stored in the first memory to a filter destination location included in a first filter tile that is stored in the second memory; and performing one or more matrix multiplication operations between the first image tile and the first filter tile to generate a first output tile associated with an output matrix that is stored in the second memory.

Further embodiments provide, among other things, a non-transitory computer-readable medium and a system configured to implement the method set forth above.

One advantage of the disclosed techniques is that applications can exploit optimized implementations of matrix multiplication functions to efficiently perform multi-convolution operations while optimizing on-chip memory usage. More specifically, by processing each image tile of a virtual image matrix independently of the other image tiles, on-chip memory usage is minimized. Notably, applications may implement convolutional neural networks (CNNs) based on the disclosed techniques to minimize error rates while optimizing both on-chip memory usage and execution time.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
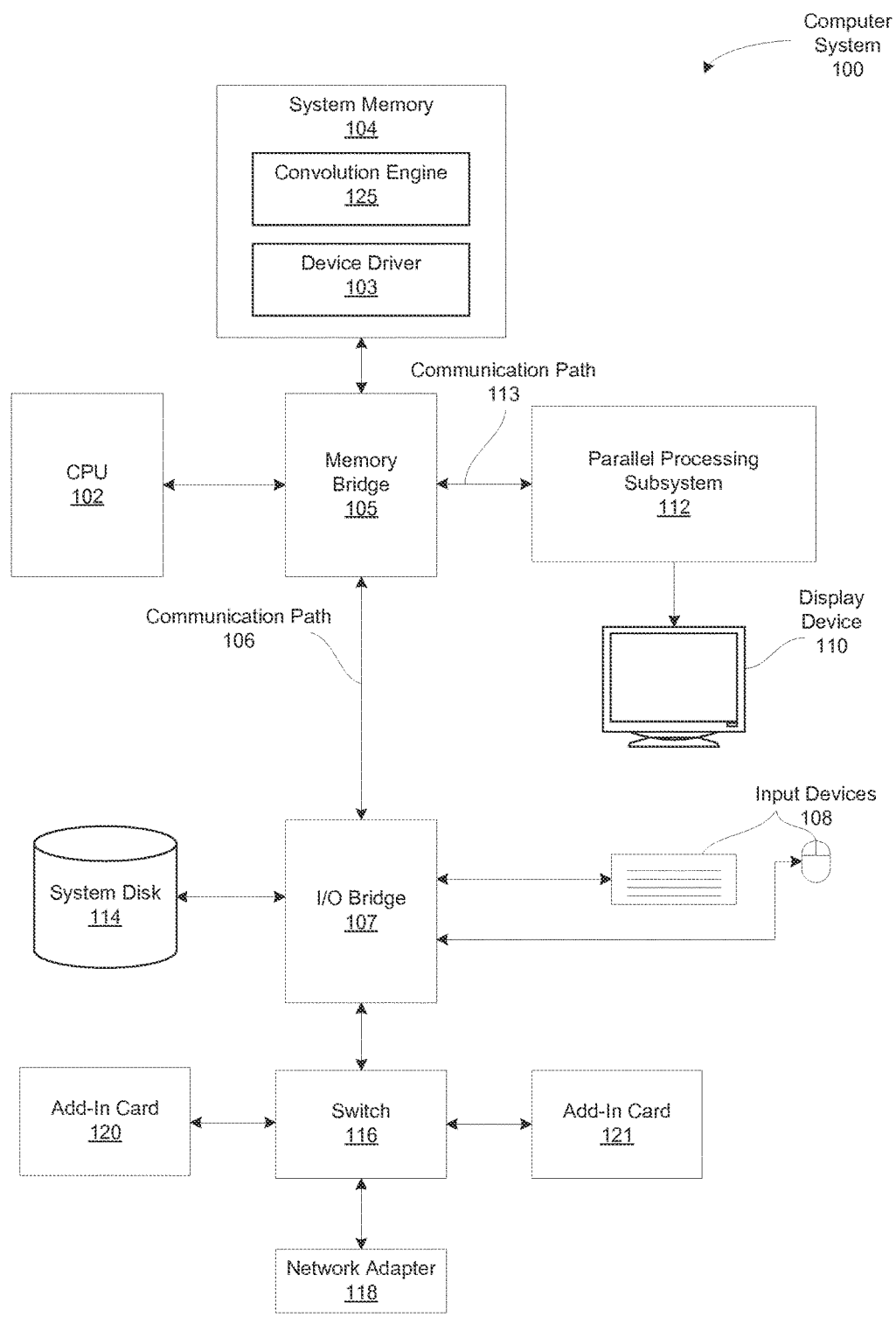
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations.

As shown, the system memory 104 includes at least one device driver 103 and a convolution engine 125. The device driver 103 is configured to manage the processing operations of the one or more PPUs within parallel processing subsystem 112. The convolution engine 125 configures the parallel processing subsystem 112 to efficiently perform multi-convolution operations. Notably, such multi-convolution operations dominate the time required to execute Convolutional Neural Networks (CNN). Although not shown, the system memory 104 also includes any number of software applications that execute on the CPU 102, may issue commands that control the operation of the PPUs, and may leverage the convolution engine 125 to efficiently execute CNNs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
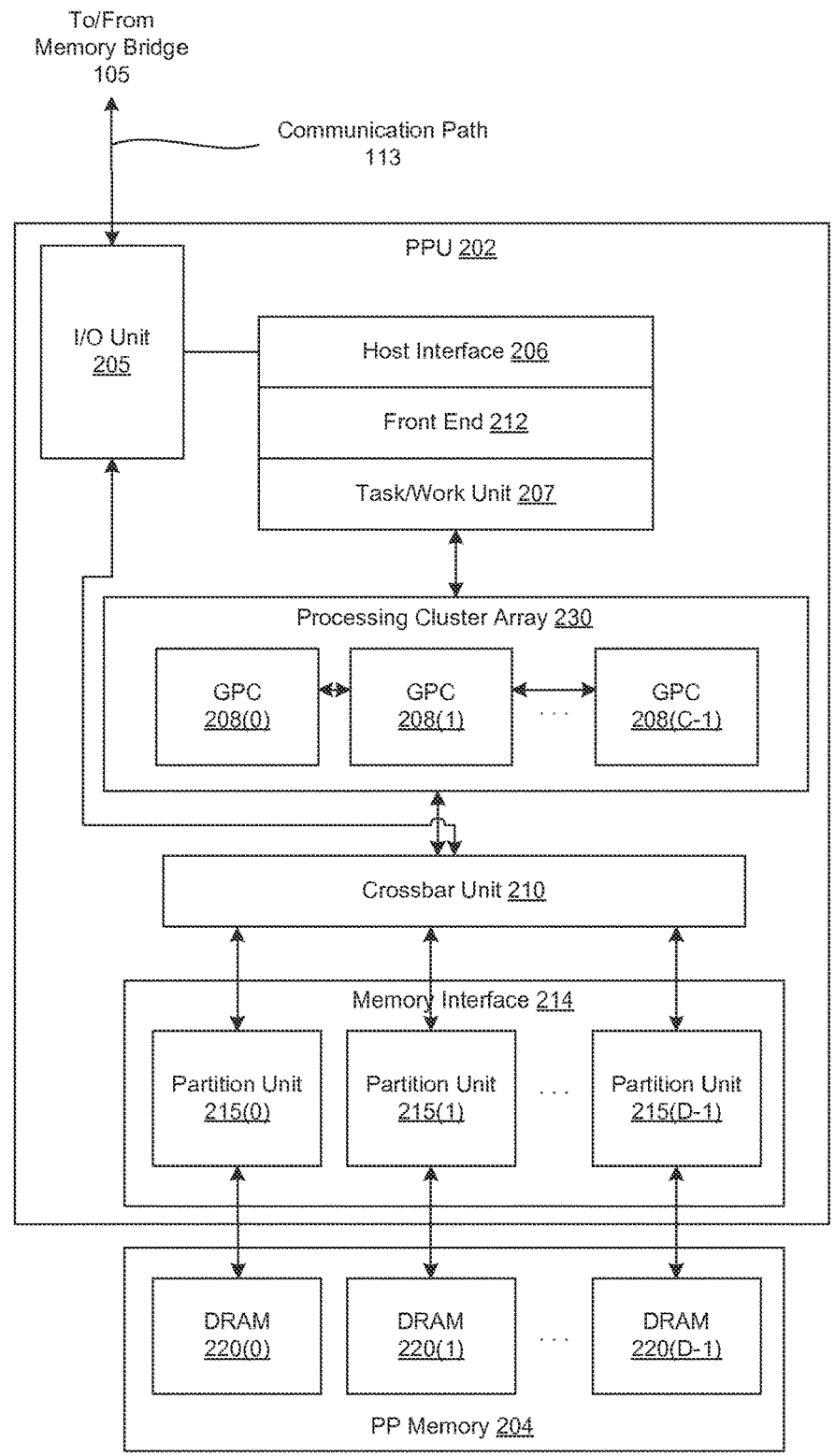
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
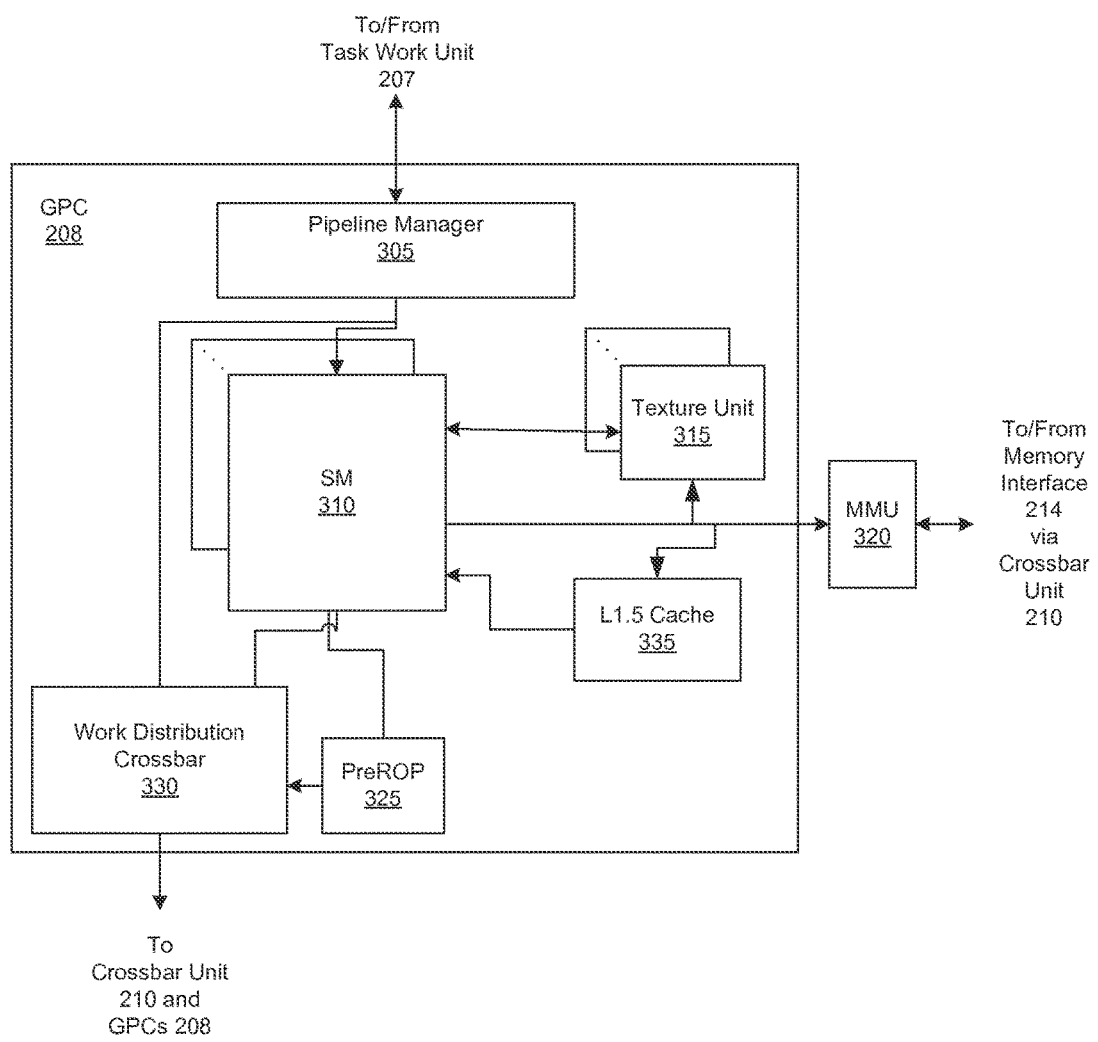
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown in FIG. 3), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating-point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Generating Image Tiles

In general, the SM 310 may be configured to execute a large number of threads in parallel to perform graphics, general processing and/or compute operations. Notably, the concurrency and dedicated memory resources provided by the SM 310 typically allow the SM 310 to optimize the execution of computationally-intensive operations. One computationally-intensive operation that is particularly well-suited for execution by the SM 310 is the multi-convolution operation. Typically, conventional techniques that leverage parallel processing subsystems to perform multi-convolution operations exploit optimized implementations of matrix multiplication functions provided by the SMs 310.

One limitation of such matrix-based approaches to performing multi-convolution operations is that the memory required to set-up efficient matrix multiplication operations may strain the available on-chip memory dedicated to the SM 310, such as the L1 cache. Such on-chip memory is also referred to herein as "shared" memory. More specifically, to enable the SM 310 to efficiently perform matrix multiplication operations while reducing time-consuming data fetches from off-chip memory (e.g., the PP memory 204), matrix-based approaches typically create and store an image matrix in the shared memory. However, the image matrix that is the input to the matrix multiplication is a bloated version—containing significant redundant data—of the image batch that is the input to the multi-convolution image. Accordingly, to exploit the optimized matrix multiplication functions implemented in the SM 310 without straining the shared memory, the convolution engine 125 configures the SM 310 to execute matrix multiplication operations on sub-matrices, referred to herein as tiles, of the image stack.

Figure 4:
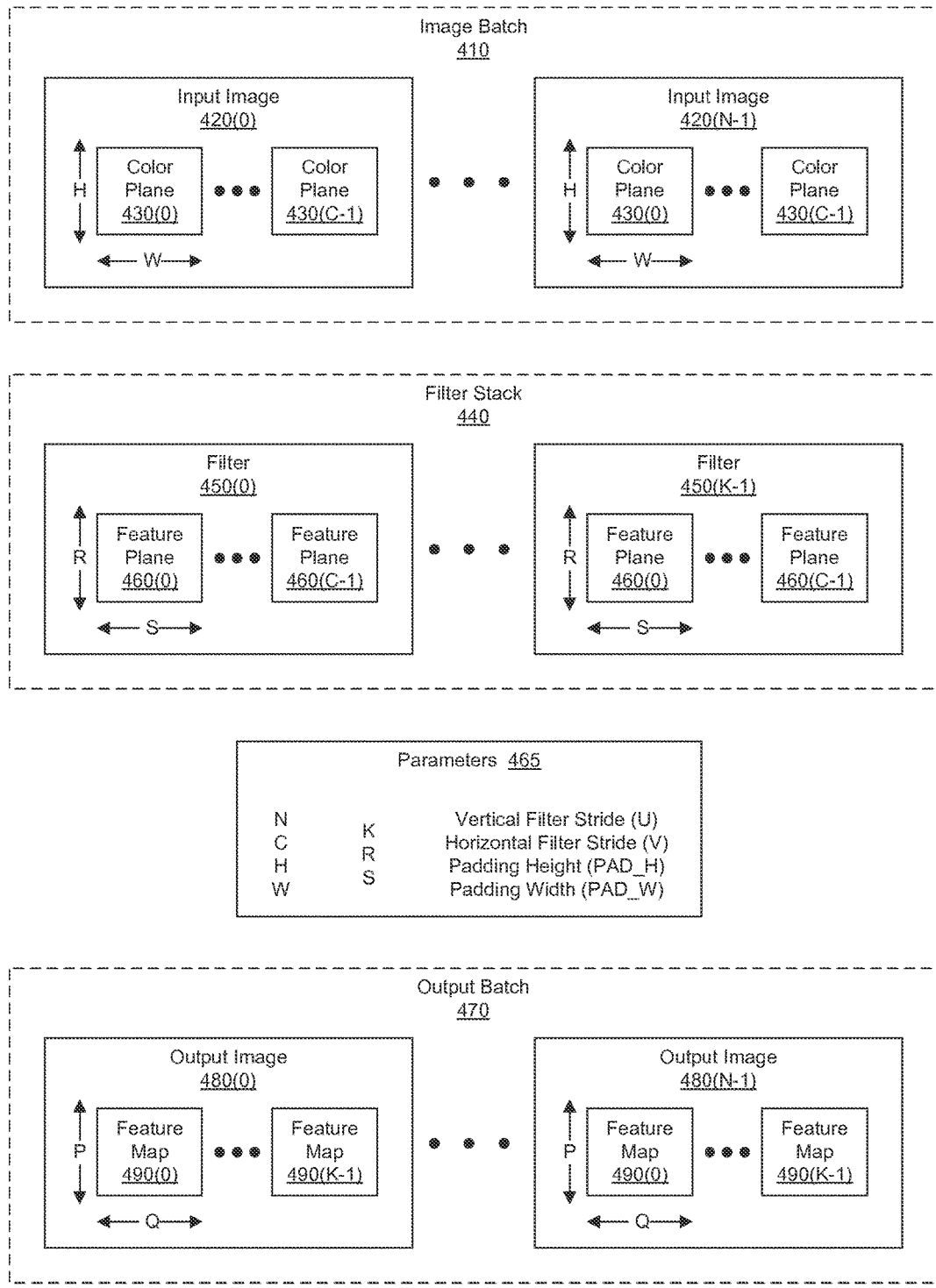
FIG. 4 illustrates an image batch, a filter stack, and an output batch associated with a multi-convolution operation, according to one embodiment of the present invention.

FIG. 4 illustrates an image batch 410, a filter stack 440, and an output batch 470 associated with a multi-convolution operation, according to one embodiment of the present invention. In the context of FIG. 4, the streaming multiprocessor (SM) 310 is configured to perform a multi-convolution operation between the image batch 410 and the filter stack 440 to produce the output batch 470. The multi-convolution operation corresponds to the predominant calculation involved in executing a particular convolution layer included in a CNN.

As shown, the image batch 410 includes, without limitation, any number of input images 420(0:N−1). For explanatory purposes, multiple instances of like objects are denoted with reference numbers identifying the object and parenthetical numbers identifying the instance where needed. Further, a range of "X" like objects are denoted with a parenthetical range (i.e., (0:X−1)). Each of the input images 420 includes, without limitation, any number of color planes 430(0:C−1). For example, each of the input images 420 may include three color planes 430: the color plane 430(0) "red," the color plane 430(1) "green," and the color plane 430(2) "blue." Each of the input images 420 is associated with an image height, shown as "H," and an image width, shown as "W." Notably, the image height and the image width define the dimensions of each of the color planes 430. Accordingly, the image batch 410 includes (N×C×H×W) unique values.

In a complementary fashion, the filter stack 440 includes, without limitation, any number of filters 450(0:K−1). In some embodiments, each of the filters 450 may represent a triggering search item associated with the layer of the CNN. For example, the CNN may be included in a face recognition algorithm, and the filter 450(0) may represent an ear. Each of the filters 450 includes, without limitation, features planes 460(0:C−1), where the number of the feature planes 460 is equal to the number of the color planes 430. Each of the filters 450 is associated with a filter height, shown as "R," and an filter width, shown as "S." The filter height and the filter width define the dimensions of each of the feature planes 460 and, therefore, the filter stack 440 includes (K×C×R×S) unique values.

As also shown, there are nine parameters 465 associated with the multi-convolution operation. The dimensions of the image batch 410 and the filter stack 440 represent five independent parameters of the multi-convolution operation: N (the number of the input images 420 in the image batch 410), C (the number of the color planes 430 in each of the input images 420 and the number of the feature planes 460 in each of the filters 450), H (the image height), W (the image width), K (the number of the filters 450 in the filter stack 440), R (the filter height), and S (the filter width). The parameters 465 also include, without limitation, V (a horizontal filter stride), U (a vertical filter stride), PAD_H (a padding height), and PAD_W (a padding width). The horizontal filter stride and the vertical filter stride reduce the computational load by decreasing the size of the subset of pixels involved in the multi-convolution operation. Notably, the horizontal filter stride and the vertical filter stride not only reduce the time required to perform the multi-convolution operation, but also reduce the size of the output batch 470 produced by the multi-convolution operation. The padding height (PAD_H) and the padding width (PAD_W) append, respectively, rows of zeros and columns of zeros to output images 480 included in the output batch 470 for any technical reason, such as formatting for future operations.

The output batch 470 includes, without limitation, the output images 480(0:N−1), where the number of the output images 480 equals the number of the input images 420. Each of the output images 480 includes, without limitation, feature maps 490(0:K−1), where the number of the feature maps 490 equals the number of the filters 450. Each of the output images 480 is associated with an output height, shown as "P," and an output width, shown as "Q." The output height and the output width define the dimensions of the features maps 490. Accordingly, the output batch 470 includes (N×K×P×Q) unique values.

As previously disclosed herein, the convolution engine 125 leverages the optimized matrix multiplication capabilities of the SM 310 to efficiently perform the multi-convolution operation. As persons skilled in the art will recognize, the multi-convolution operation between the input batch 410 and the filter stack 440 may be converted to matrix multiplication operations between an image matrix and a filter matrix. The conversion operations are well-known in the art and result in deterministic relationships between the values included in the input batch 410 and the values included in the image matrix. In a complementary fashion, the conversion operations result in deterministic relationships between the values included in the filter stack 440 and the values included in the filter matrix. To optimize the use of the shared memory, the convolution engine 125 does not create either the image matrix or the filter matrix, however the convolution engine 125 configures the SM 310 based on these deterministic relationships.

Figure 5:
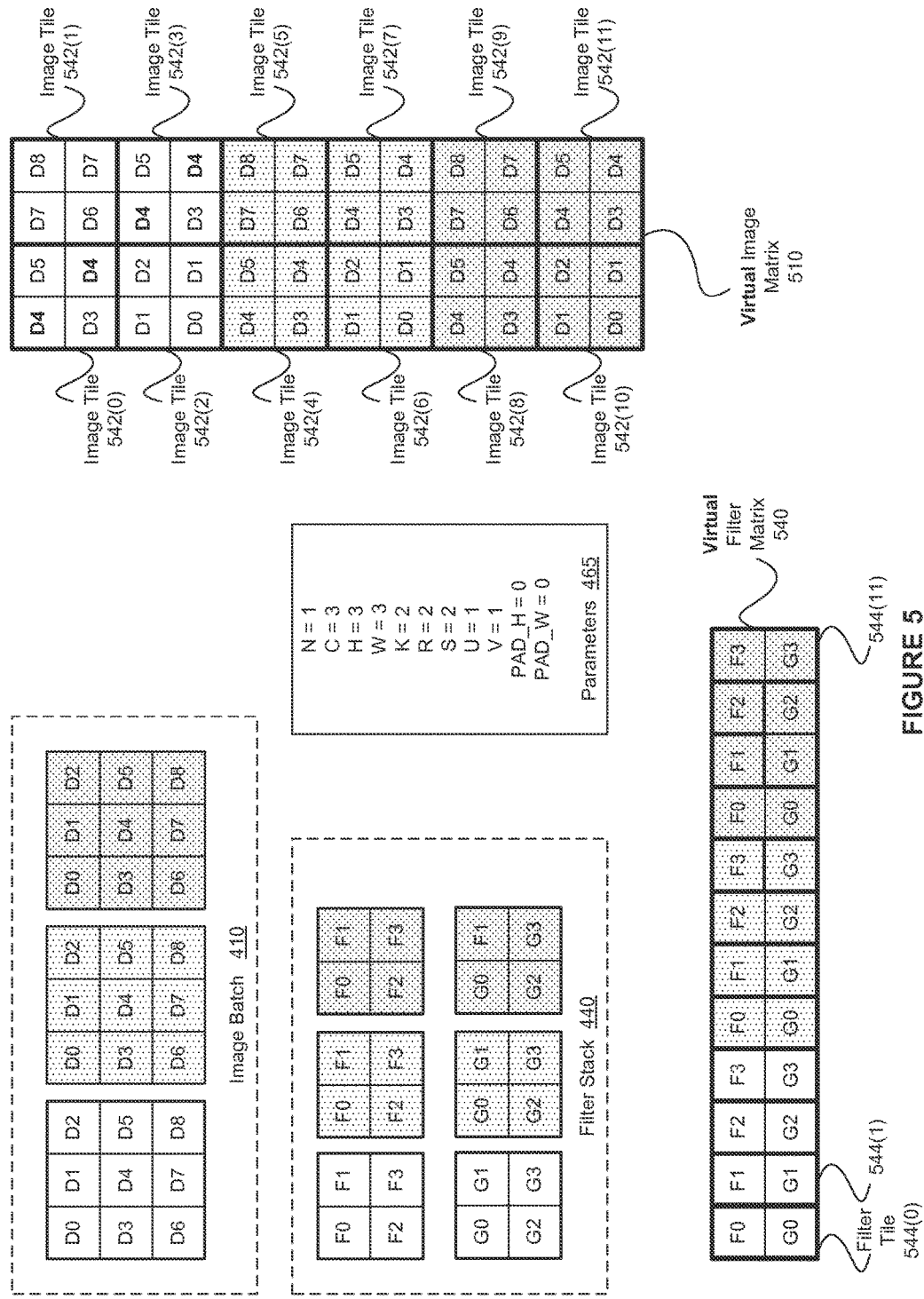
FIG. 5 illustrates the relationships between the image batch 410 of FIG. 4, a virtual image matrix, and a set of image tiles, according to one embodiment of the present invention.

FIG. 5 illustrates relationships between the image batch 410 of FIG. 4, a virtual image matrix 510, and a set of image tiles 542, according to one embodiment of the present invention. FIG. 5 also illustrates relationships between the filter stack 440 of FIG. 4, a virtual filter matrix 540, and filter tiles 544. For explanatory purposes, the parameters 465, and consequently the dimensions of the image batch 410, the virtual image matrix 510, the filter stack 440, and the virtual filter matrix 540, are: N=1, C=2, H=3, W=3, K=2, R=2, S=2, U=1, V=1, PAD_H=0, and PAD_W=0.

As part of the conversion between the image batch 410 and the virtual image matrix 510, each of the rows of the virtual image matrix 510 is associated with the values included in the image batch 410 that are required to compute one or more of the output images 480 included in the output batch 470. Such a conversion includes duplication of some of the values included in the image batch 410. For example, as depicted for the value "D4," the center of each of the three-by-three color planes 410 is used four times to compute each of four feature maps 490 and, consequently, each of the center values (e.g., the "D4" values) is associated with four separate rows of the virtual image matrix 510. As a result, multiple locations in the virtual image matrix 510 are associated with a single location in the image batch 410. In a complementary manner, each of the columns of the virtual filter matrix 540 contains the values included in the filter stack 440 that are required to compute one or more of the output images 480 included in the output batch 470.

In general, if the dimensions of the input batch 410 are (N×C×H×W), the dimensions of the filter stack 440 are (K×C×R×S), and the dimensions of the output batch 470 are (N×K×P×Q), then the dimensions of the virtual image matrix 510 are (C×R×S)×(N×P×Q), the dimensions of the virtual filter matrix 540 are K×(C×R×S), and the dimensions of the output matrix (not shown) are K×(N×P×Q). For the example shown in FIG. 5, the dimensions of the input batch 410 are (1×3×3×3), the dimensions of the filter stack 440 are (2×3×2×2), and the dimensions of the output batch 470 are (1×2×2×2). Consequently, the dimensions of the virtual image matrix 510 are (12×4), the dimensions of the virtual filter matrix 540 are (2×12) and the dimensions of the output matrix (not shown) are (2×4).

Notably, because the dimensions of the virtual image matrix 510 are products of the independent parameters associated with the multi-convolution operation, the matrix-based multi-convolution operation exhibits relatively uniform behavior across varying parameters. For example, although the parameters C, R, and S may individually vary dramatically across the multi-convolution operations associated with different layers of a particular CCN, the products of the parameters C, R, and S typically do not vary dramatically across the multi-convolution operations. Consequently, the optimized performance of the matrix-based multi-convolution operation is relatively consistent across changes in the values of individual parameters.

As the (C×R×S)×(N×P×Q) dimensions of the virtual image matrix 510 illustrate, simultaneously and redundantly storing the values associated with all the locations included in the virtual image matrix 510 may strain the shared memory. Consequently, the convolution engine 125 configures the SM 310 to manifest and process the virtual image matrix 510 in a "lazy" manner. More specifically, the convolution engine 125 partitions the virtual image matrix 510 into separate image tiles 542, and then configures the SM 310 to process the image tiles 542. Further, the convolution engine 125 associates each of the locations included in each of the image tiles 542 with a virtual location included in the virtual image matrix 510. For example, as depicted in FIG. 5, the convolution engine 125 associates the four locations include in the image tile 542(11) with the four locations included in the lower right corner of the virtual image matrix 510.

Each of the locations included in the virtual image matrix 510 is related deterministically to a location included in the image batch 410. Consequently, each of the locations included in the image tiles 542 is deterministically related to a location included in the image batch 410. Accordingly, the convolution engine 125 may perform indexing operations that enable the convolution engine 125 to copy the proper data from the image batch 410 directly to each location included in each of the image tiles 542 without creating the virtual input matrix 510. An example of such indexing operations is described in greater detail in FIG. 7.

As part of processing each of the image tiles 542, the SM 310 loads data from the image batch 410 to form the image tile 542, and loads data from the filter stack 440 to form the corresponding filter tile 544. The SM 310 then performs matrix multiplication operations between the image tile 542 and the filter tile 544, stores the result as an output tile in the shared memory, and then discards the data include in the image tile 542 and the filter tile 544. Consequently, at any given point in time, the shared memory includes the image tiles 542 that the SM 310 is currently processing, does not include the image tiles 542 that the SM 310 has already processed, and does not include the image tiles 542 that the SM 310 has not begun processing.

The convolution engine 125 may set the size of the image tile 542 in any technically feasible fashion that optimizes the capabilities of the SM 310. For example, the convolution engine 125 may set the size of the image tile 542 based on any number and combination of the size of the shared memory (e.g., the L1 cache), the number of threads in each thread group, and so forth. In alternate embodiments, the convolution engine 125 may receive the size of the image tile 542 as an auxiliary input to the multi-convolution operation. The convolution engine 125 sets the size of the filter tile 544 based on the size of the image tile 542. More specifically, the convolution engine 125 sets the size of the filter tile 545 such that the matrix multiplication between each the image tiles 542 and the corresponding filter tile 544 produces the data to properly populate an output tile.

In alternate embodiments, the convolution engine 125 may configure the SP 310 based on any technically feasible implementation of the virtual image matrix 510 and the virtual filter matrix 540 that facilitate performing the multi-convolution operation via matrix multiplication operations. Further, the convolution engine 125 may partition the data included in the virtual image matrix 510 and the virtual filter matrix 540 into image tiles 542 and filter tiles 544 in any technically feasible, consistent fashion.

Performing Matrix-Based Multi-Convolution Operations

Figure 6:
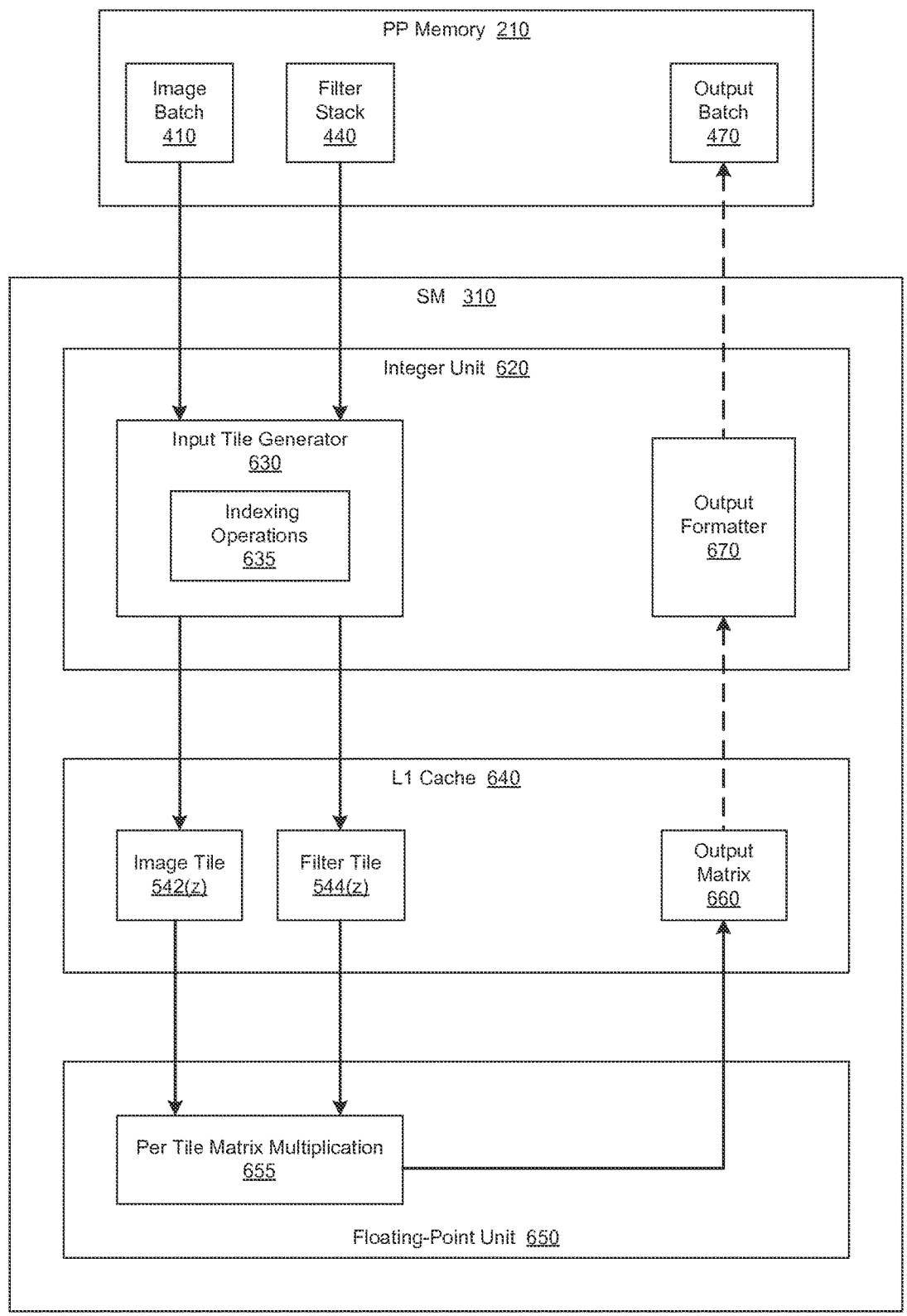
FIG. 6 illustrates the streaming multiprocessor of FIG. 3 configured to perform a multi-convolution operation, according to one embodiment of the present invention.

FIG. 6 illustrates the streaming multiprocessor 310 of FIG. 3 configured to perform a multi-convolution operation, according to one embodiment of the present invention. In the context of FIG. 4, the convolution engine 125 configures functional units (e.g., execution units, load-store units, etc.) included in the streaming multiprocessor (SM) 310 to perform operations that implement multi-convolution operations. For explanatory purposes, operations performed by the SM 310, including the functional execution units, that are configured by the convolution engine 125 are also referred to herein as operations performed by the convolution engine 125.

In operation, to exploit the parallel processing capabilities of the SM 310, the convolution engine 125 assigns the processing of each of the image tiles 542 to a thread group or a thread array. Further, for each of the image tiles 542, the convolution engine 125 assigns the processing of each of the locations included in the image tile 542 to a thread included in the assigned thread group. As persons skilled in the art will recognize, the convolution engine 125 may assign any number of image tiles 542 to a single thread group and/or may assign any number of locations to a single thread. If a thread group is assigned to process multiple image tiles 542, then the thread group may sequentially process the assigned image tiles 542 or may distribute the processing in any technically feasible fashion between the threads included in the thread group. If a thread is assigned to process multiple locations included in the image tile 542, then the thread may sequentially process the assigned locations.

Advantageously, the convolution engine 125 may configure the SM 310 to pipeline the processing of the image tiles 542 to minimize the latency associated with accessing the input data included in the PP memory 210. More specifically, the convolution engine 125 may configure the SM 310 to copy data included in the image batch 410 and the filter stack 440 to, respectively, the image tile 542(0) and the filter tile 544(0). The convolution engine 125 may configure the SM 310 to then perform matrix multiplication operations between the image tile 542(0) and the filter tile 544(0) and, substantially in parallel, copy data included in the image batch 410 and the filter stack 440 to, respectively, the image tile 542(1) and the filter tile 544(1). In alternate embodiments, the convolution engine 125 may orchestrate any type of pipelining in any technically feasible fashion. For example, and without limitation, the convolution engine 125 may strategically assign the processing the image tiles 542 to thread groups to facilitate a two stage (loading data and performing matrix multiplication operations) pipeline.

As shown, the SM 310 includes, without limitation, an integer unit 620, an L1 cache 640, and a floating-point unit 650. In operation, the SM 310 accesses data in the image batch 410 and a filter stack 440, performs a tile-based multi-convolution operation between the image batch 410 and the filter stack 440, and stores the results as the output batch 470. The image batch 410, the filter stack 440, and the output batch 470 are included in the PP memory 210. For explanatory purposes, solid lines indicate the operations performed by a single thread group within the SM 310 during the processing of each of the image tiles 542. By contrast, dotted lines indicate the operations performed by any number of thread groups within the SM 310 after the SM 310 has finished performing the matrix multiplication operations associated with the multi-convolution operation.

The integer unit 620 includes, without limitation, an input tile generator 630 that implements indexing operations 635. As used herein, the input tile generator 630 refers to a thread executing the indexing operations 635 within the integer unit 620 as part of populating one or more locations included in the input tile 542 and the filter tile 544. In general, given a destination location included in the virtual input matrix 510, the indexing operations 635 return the source location in the image batch 410 that is associated with the destination location.

Figure 7:
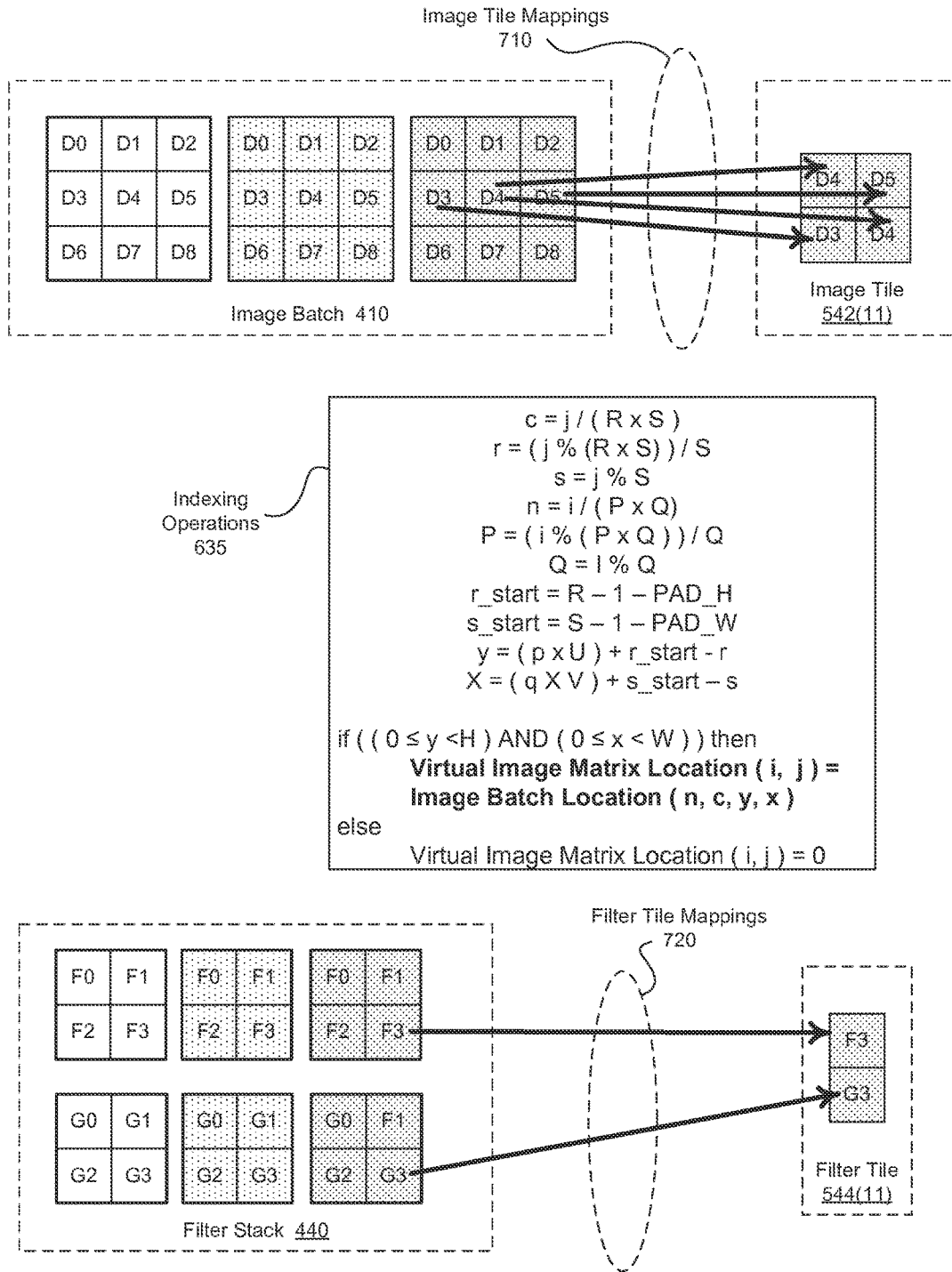
FIG. 7 illustrates indexing operations that the convolution engine of FIG. 1 may implement to generate the image tiles of FIG. 5 during a multi-convolution operation, according to one embodiment of the present invention.

In operation, for each thread, the input tile generator 630 determines the virtual location in the virtual input matrix 510 that is associated with the location in the image tile 542 that is assigned to the thread. As disclosed previously herein, as part of partitioning the virtual image matrix 510, the convolution engine 125 associates each of the locations in each of the image tiles 542 with a virtual location included in the virtual image matrix 510. Subsequently, the input tile generator 630 executes the indexing operations 635 to calculate the source location based on the virtual location. The indexing operations 635 may be implemented in any technically feasible fashion that is consistent with the deterministic relationships that the convolution engine 125 establishes between the image batch 410, the virtual image matrix 510, and the image tiles 542. FIG. 7 describes one implementation of the indexing operations 635. After determining the source location, the input tile generator 630 coordinates with a load-store unit (not shown) to copy the data included in the source location in the image batch 410 included in the PP memory 210 to the destination location in the image tile 542 included in the L1 cache 640 (i.e., shared memory).

The input tile generator 630 may copy data from the filter stack 440 included in the PP memory 210 to the filter tile 544 included in the L1 cache 640 in any technically feasible fashion that is consistent with the data included in the image tile 542. For example, the input tile generator 630 may implement a linear mapping between the filter stack 440 and the filter tile 544 based on the source locations associated with the image tile 542.

After each thread group has finished generating the assigned image tile 542 and the corresponding filter tile 544, the thread group executes within the floating-point unit 650, implementing the functionality of "per tile matrix multiplication" 655. More specifically, each of the thread groups configures the floating-point unit 650 to perform matrix multiplication operations between the assigned image tile 542 and the corresponding filter tile 544. The thread group further configures the floating-point unit to store the results of the matrix multiplication as a tile included in an output matrix 660 that the SM 310 stores in the L1 cache 640.

After the thread groups have finished generating all the output tiles included in the output matrix 660, one or more of the thread groups configure the integer unit 620 to implement an output formatter 670. The output formatter 670 coordinates with load store units to perform operations that transpose the output matrix 660 into the output batch 470 included in the PP memory 210. The output formatter 670 may implement any number formatting operations that generate the output batch 470 based on any organization or any subset or superset of the data included in the output matrix 660. Typically, the output batch 470 timplements a format that is consistent with the format of the image batch 410, thereby enabling the output batch 470 to be used as the input batch 410 for the multi-convolution operation that implements the next convolution layer included in the CNN.

In general, components included in the computer system 100 may store any of the image batch 410, the filter stack 440, and/or the output batch 470 in any type of memory structure included in the PP memory 210. For example, any number, including zero, of the image batch 410, the filter stack 440, and the output batch 470 may be included in a frame buffer. In other embodiments, components included in the computer system 100 may store the image batch 410, the filter stack 440, and/or the output batch 470 in any type of memory instead of the PP memory 210.

In alternate embodiments, the convolution engine 125 may store the image tiles 442, the filter tiles 444, and/or the output matrix 460 in any type of "shared memory" instead of the L1 cache 440. The shared memory may include any one or more technically feasible memories, including, without limitation, a local memory shared by one or more SMs 310, an on-chip memory accessible via the memory interface 214, or a cache memory. Further, as used herein, references to cache memory may include any one or more technically feasible memories, including, without limitation, the L1 cache 440, the L1.5 cache 335, and L2 caches.

FIG. 7 illustrates the indexing operations 635 that the convolution engine 125 of FIG. 1 may implement to generate the image tiles 542 of FIG. 5 during a multi-convolution operation, according to one embodiment of the present invention. As shown, FIG. 7 depicts the indexing operations 635 as pseudocode that the convolution engine 125 may configure the SM 310 to implement. FIG. 7 further depicts image tile mappings 710 and filter tile mappings 720.

The indexing operations 635 specify a mapping from a location associated with the virtual image matrix 510 to a location included in the image batch 410. Since the convolution engine 125 associates each of the locations in each of the image tiles 542 with a virtual location in the virtual image matrix 510, the convolution engine 125 may leverage the indexing operations 625 to properly populate the image tiles 542. In particular, for each destination location in each of the image tiles 542, the input tile generator 630 performs the indexing operations 635 to determine the corresponding source location in the image batch 410. In alternate embodiments, the indexing operations 635 may include any number of operations specified in any technically feasible fashion that is consistent with the deterministic relationships that the convolution engine 125 establishes between the image batch 410, the virtual image matrix 510, and the image tiles 542.

The image tile mappings 710 depicts the mappings of locations in in the image batch 410 to locations in the image tile 542(11) of FIG. 5. Referring to FIG. 5, the image tile 542(11) is associated with the (2×2) submatrix that forms the lower right corner of the virtual image matrix 510. Consequently, the convolution engine 125 performs the indexing operations 625 that determine the source locations in the image batch 410 that correspond to the lower right corner destination locations in the virtual image matrix 510.

Referring back now to FIG. 7, based on the indexing operations 625, the convolution engine 125 copies the data at three source locations D3, D4, and D5 to the four destination locations included in the image tile 542(11). More specifically, the convolution engine 125 maps the data at the source location D3 to a single destination location, the data at the source location D4 to two destination locations, and the data at the source location D5 to a single destination location.

In a complementary fashion, the filter tile mappings 720 depict the mapping of the filter stack 440 to the filter tile 544(11) that corresponds to the image tile 542(11). The image tile mappings 710 depicts the mapping of the filter stack 540 to the filter tile 544(11) of FIG. 5. Referring to FIG. 5, the filter tile 544(11) is associated with the (2×1) submatrix that forms the rightmost side of the virtual filter matrix 540 and includes the source locations F3 and G3. According, referring back now to FIG. 7, the convolution engine 125 copies the data at two source locations F3 and F4 in the filter stack 440 to two destination locations in the filter tile 544(11).

Figure 8:
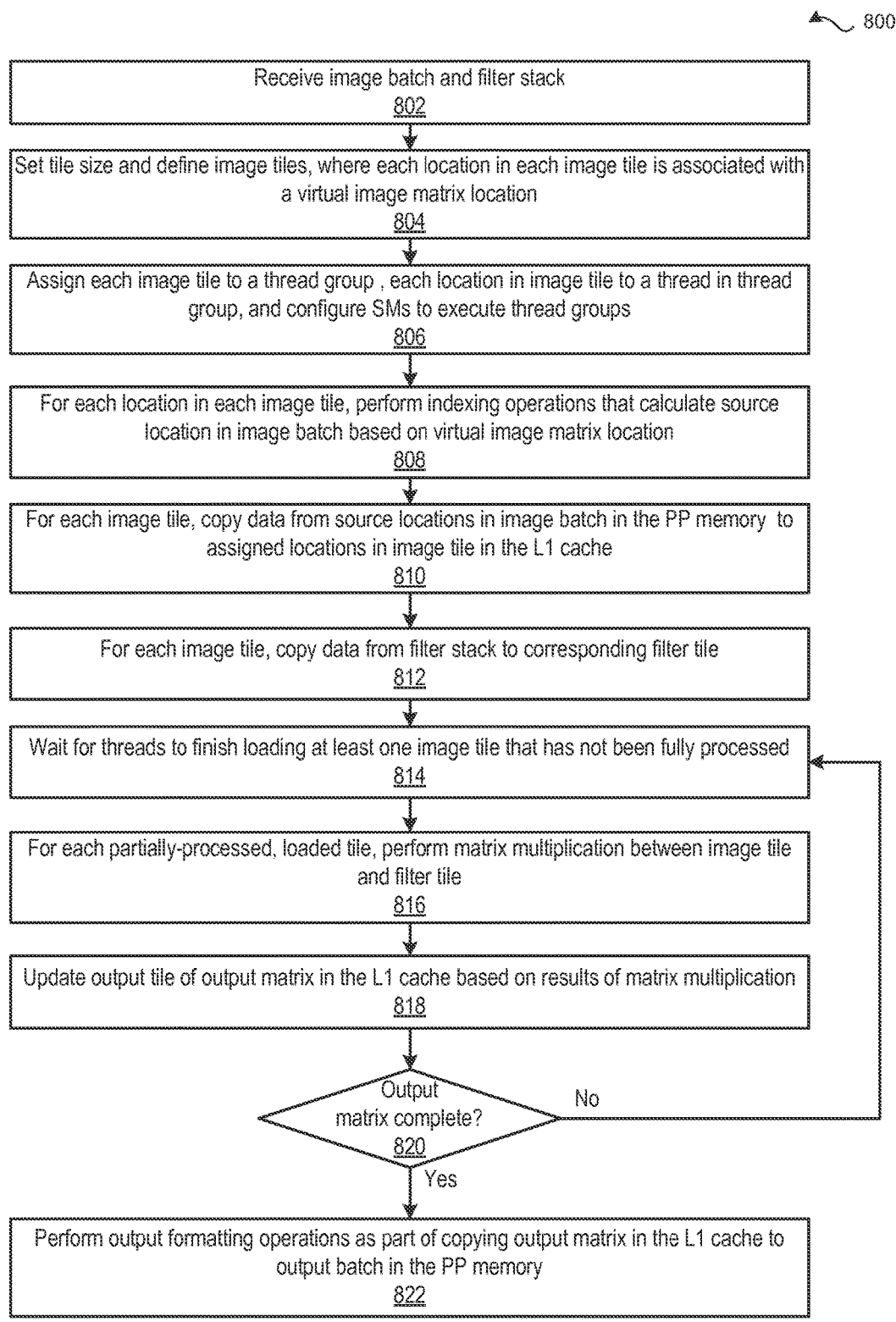
FIG. 8 is a flow diagram of method steps for performing a multi-convolution operation in a parallel processing system, according to one embodiment of the present invention.

FIG. 8 is a flow diagram of method steps for performing a multi-convolution operation in a parallel processing system, according to one embodiment of the present invention. Although the method steps are described in conjunction with the systems of FIGS. 1-7, persons skilled in the art will understand that any system configured to implement the method steps, in any order, falls within the scope of the present invention.

As shown, a method 800 begins at step 802, where the convolution engine 125 receives the image batch 410 and the filter stack 440. At step 804, the convolution engine 125 determines the size of the image tile 542, and defines the image tiles 542—associating the locations in each of the image tiles 542 with locations in the virtual image matrix 510 associated with the image batch 410. At step 806, the convolution engine 125 assigns the processing of each of the image tiles 542 to a thread group. For each of the image tiles 542, the convolution engine 125 also assigns the processing of each of the locations in the image tile 542 to a thread in the assigned thread group. The convolution engine 125 then configures the SM 310 to execute the thread groups.

At step 808, for each location in each of the image tiles 542, the assigned thread executing in the integer unit 620 performs the indexing operations 635. Notably, each of the threads determines the source location in the image stack 410 based on the virtual location in the virtual image matrix 510 that is associated with the assigned location. At step 810, for each of the image tiles 542, the threads in the assigned thread group copy data from the source locations in the image batch 410 included in the PP memory 210 to the assigned locations in the assigned image tile 542 included in the L1 cache 640. At step 810, for each of the image tiles 542, the threads in the assigned thread group copy data from the filter stack 440 included in the PP memory 210 to the filter tile 544 included in the L1 cache 640 that corresponds to the assigned image tile 542.

At step 814, the SM 310 waits for the threads for finish loading (i.e., copying data to) at least one of the image tiles 514 that has not been fully processed. More specifically, as persons skilled in the art will recognize, the threads may execute in the SM 310 concurrently, sequentially, or in any combination thereof. For example, at a given point in time, one thread may have finished performing matrix multiplication between the image tile 514(3) and the filter tile 544(3) and, consequently, fully processed the image tile 514(3). Another thread may have finished copying data to the image tile 514(4) and the filter tile 544(4) and a third thread may be copying data to the image tile 514(5).

At step 818, for each of the partially-processed, loaded image tile 514, the SM 310 performs matrix multiplication operations between the image tile 514 and the corresponding filter tile 544. At step 820, the SM 310 determines whether the SM 310 has generated all the output tiles included in the output matrix 660. If, at step 820, the SM 310 determines that the output matrix 660 is not complete, then the method 800 returns to step 814, where the SM 310 waits for the threads to finish loading at least one of the image tiles 514 that has not been fully processed. The SM 310 continues in this fashion, cycling through steps 814-820, until the threads configured by the convolution engine 125 (at step 806) have finished generating the output matrix 660.

If, however, at step 820, the SM 310 determines that the output matrix 660 is complete, then the method 800 proceeds to step 822. At step 822, threads configured by the convolution engine 125 copy the data included in the output matrix 660 to the output batch 470 included in the PP memory 120. As part of step 820, the threads may configure the SM 310 to implement the output formatter 670. The output formatter 670 may perform any number of formatting operations (e.g., transposition, translation, formatting, padding, and the like) to convert the data included in the output matrix 660 to a specified format for the output batch 470. In particular, the output formatter 670 may generate the output batch 470 in a format that enables the convolution engine 125 to use the output batch 470 as the input batch 410 for a subsequent multi-convolution operation.

In sum, the disclosed techniques enable a convolution engine to efficiently perform multi-convolution operations in a parallel processing system. In general, the convolution engine implements a virtual image matrix conforming to a column major format that enables a matrix-based convolution operation. Notably, to optimize on-chip memory, the convolution engine configures the parallel processing system to maintain only currently relevant image tiles of the virtual image matrix in the on-chip memory instead of the entire virtual image matrix.

In operation, the convolution engine divides the virtual image matrix into separate image tiles and then assigns the processing of each image tile to a different thread group. For each thread group, the threads included in each thread group configure the integer unit to perform indexing operations that determine source locations in the image stack—stored in off-chip memory—based on the location of the assigned image tile within the virtual image matrix. The threads then copy the data from the image stack to the assigned image tile included in on-chip memory. Subsequently, the threads configure the floating-point unit to perform matrix multiplication operations between the image tile and the corresponding filter tile to generate data included in an output tile of the output matrix.

Notably, since the threads included in the different thread groups may operate substantially in parallel, the integer unit may generate one image tile while the floating-point unit performs matrix multiplication operations between another image tile and a filter tile. After the thread groups have finished generating all the output tiles, the convolution engine configures the threads to copy the data included in the output matrix to an output stack included in the off-chip memory. As part of the copying operation, the threads, executing in the integer unit, perform operations that transpose the output matrix into an output batch. The output batch typically implements a format that is consistent with the format of the image batch, thereby enabling the output batch to be used as the input batch for the multi-convolution operation that implements the next convolution layer included in the CNN.

At least one advantage of the disclosed approach is that the convolution engine fully exploits the benefits inherent in parallel processing systems to achieve the high accuracy provided by CNNs while optimizing execution speed and on-chip memory usage. More specifically, by configuring the parallel processing pipeline to process each image tile of a virtual image matrix independently of the other image tiles, the convolution engine reaps the benefits of optimized matrix multiplication implementations while minimizing on-chip memory usage Further, since the dimensions of the virtual image matrix and the virtual filter matrix correlate to products of subsets of the independent parameters of the CNN instead of the individual parameters, the convolution engine exhibits relatively uniform performance characteristics across the input parameters. Consequently, an application may use the convolution engine to efficiently and reliably solve problems of any size, across the entire range of layers of the CNN.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for performing a multi-convolution operation, the method comprising:
calculating a first source location included in an image batch that is stored in a first memory based on a first destination location included in a first image tile that is stored in a second memory, wherein the first image tile comprises a subset of the image batch, wherein calculating the first source location comprises associating the first destination location with a first virtual location included in a virtual image matrix and performing one or more indexing operations that map the first virtual location to the first source location;
copying data from the first source location to the first destination location;
copying data from a filter source location included in a filter stack that is stored in the first memory to a filter destination location included in a first filter tile that is stored in the second memory; and
performing one or more matrix multiplication operations between the first image tile and the first filter tile to generate a first output tile associated with an output matrix that is stored in the second memory.

2. The computer-implemented method of claim 1, wherein the first memory comprises off-chip memory and the second memory comprises on-chip memory.

3. The computer-implemented method of claim 1, wherein associating the first destination location comprises performing one or more arithmetic calculations based on at least one of a size of the second memory and the number of threads included in a thread group.

4. The computer-implemented method of claim 1, further comprising, assigning the first image tile to a first thread group, and configuring a first thread included in the first thread group to calculate the first source location based on the first destination location.

5. The computer-implemented method of claim 4, further comprising, assigning a second image tile to a second thread group, and configuring a second thread included in the second thread group to calculate a second source location included in the image batch based on a second destination location included in the second image tile.

6. The computer-implemented method of claim 1, further comprising performing one or more output formatting operations based on the output matrix to generate an output batch, and storing the output batch in the first memory.

7. The computer-implemented method of claim 6, wherein the image batch comprises a first layer included in a convolutional neural network, and the output batch comprises a second layer included in the convolutional neural network.

8. The computer-implemented method of claim 1, wherein the image batch is partitioned into a plurality of image tiles, each image tile comprising a subset of the image batch.

9. The computer-implemented method of claim 1, wherein:
the image batch is partitioned into a plurality of image tiles; and
for the plurality of image tiles, the second memory stores only a current image tile that is currently being processed for matrix multiplication operations.

10. The computer-implemented method of claim 9, wherein:

for the plurality of image tiles, the second memory does not store any previous image tiles that are processed for matrix multiplication operations previous to the current image tile; and for the plurality of image tiles, the second memory does not store any subsequent image tiles that are processed for matrix multiplication operations after the current image tile.

11. The computer-implemented method of claim 1, further comprising:

calculating a second source location included in the image batch based on a second destination location included in a second image tile that is stored in a second memory, wherein the second image tile comprises a subset of the image batch, wherein the first image tile is discarded from the second memory prior to calculating the second source location.

12. A non-transitory, computer-readable storage medium including instructions that, when executed by a processor, cause the processor to perform a multi-convolution operation, by performing the steps of:

calculating a first source location included in an image batch that is stored in a first memory based on a first destination location included in a first image tile that is stored in a second memory, wherein the first image tile comprises a subset of the image batch, wherein calculating the first source location comprises associating the first destination location with a first virtual location included in a virtual image matrix and performing one or more indexing operations that map the first virtual location to the first source location;

copying data from the first source location to the first destination location;

copying data from a filter source location included in a filter stack that is stored in the first memory to a filter destination location included in a first filter tile that is stored in the second memory; and performing one or more matrix multiplication operations between the first image tile and the first filter tile to generate a first output tile associated with an output matrix that is stored in the second memory.

13. The non-transitory computer-readable storage medium of claim 12, wherein the first memory comprises off-chip memory and the second memory comprises on-chip memory.

14. The non-transitory computer-readable storage medium of claim 12, further comprising, assigning the first image tile to a first thread group, and configuring a first thread included in the first thread group to calculate the first source location based on the first destination location.

15. The non-transitory computer-readable storage medium of claim 14, further comprising, assigning a second image tile to a second thread group, and configuring a second thread included in the second thread group to calculate a second source location included in the image batch based on a second destination location included in the second image tile.

16. The non-transitory computer-readable storage medium of claim 12, wherein a plurality of dimensions of the image batch comprise a batch size, a total number of color planes, an image width, and an image height.

17. The non-transitory computer-readable storage medium of claim 12, wherein a plurality of dimensions of the filter stack comprise a total number of filter sets, a total number of feature planes, a filter width, and a filter height.

18. A system configured to perform a multi-convolution operation, the system comprising:

a first memory;

a second memory; and a convolution engine coupled to both the first memory and the second memory, and configured to:

calculate a first source location included in an image batch that is stored in the first memory based on a first destination location included in a first image tile that is stored in the second memory, wherein the first image tile comprises a subset of the image batch, wherein calculating the first source location comprises associating the first destination location with a first virtual location included in a virtual image matrix and performing one or more indexing operations that map the first virtual location to the first source location, copy data from the first source location to the first destination location, copy data from a filter source location included in a filter stack that is stored in the first memory to a filter destination location included in a first filter tile that is stored in the second memory, and perform one or more matrix multiplication operations between the first image tile and the first filter tile to generate a first output tile associated with an output matrix that is stored in the second memory.

* * * * *

UNITED STATES PATENT AND TRADEMARK OFFICE
CERTIFICATE OF CORRECTION

PATENT NO. : 10,223,333 B2
APPLICATION NO. : 14/838291
DATED : March 5, 2019
INVENTOR(S) : Chetlur et al.

Page 1 of 1

It is certified that error appears in the above-identified patent and that said Letters Patent is hereby corrected as shown below:

In the Specification

Column 1, Line 4, insert:
--GOVERNMENT RIGHTS IN THIS INVENTION
This invention was made with US Government support under Agreement HR0011-13-3-0001 awarded by DARPA. The US Government has certain rights in this invention--.

Signed and Sealed this
Twenty-eighth Day of July, 2020

Andrei Iancu
*Director of the United States Patent and Trademark Office*